Patented Oct. 19, 1954

2,692,248

UNITED STATES PATENT OFFICE 2,692,248

THE PRODUCTION OF AROMATIC POLYESTERS

James Lincoln, London, England, assignor to British Celanese Limited, a corporation of Great Britain No Drawing. Application July 1, 1952, Serial No. 296,749

Claims priority, application Great Britain July 25, 1951

15 Claims. (Cl. 260—42)

This invention relates to the production of polymers and is more particularly concerned with the production of high-melting polyesters.

It is well known to produce polyesters by condensation of a dicarboxylic acid with a glycol or by self-condensation of a hydroxy-carboxylic acid. In general the products are low melting and hence even if of sufficiently high molecular weight to produce fibres are of no value for textile fibre production. However, it is well known that by selecting certain aromatic components for the production of these polyesters a few polyesters of melting point above 200° C. can be produced. For example, when terephthalic acid is condensed with ethylene glycol the product melts at 255° C. However, the range of glycols suitable for condensation with terephthalic acid to produce high-melting polymers is very restricted, and already with tetramethylene glycol the melting point of the product is down to 218° C. Much the same applies to more complex aromatic dicarboxylic acids such as 4.4'-dicarboxy-diphenyl, 4.4'-dicarboxy-diphenyl-methane (in this case the product with ethylene glycol is substantially the only one which melts above 200° C.), 4.4(-dicarboxy-diphenyl-ethane and similar $\alpha.\omega$-bis(4-carboxyphenyl)-alkanes. The same applies also to the $\alpha.\omega$ - bis(4 - carboxyphenoxy) - alkanes. Again it is known that either 4-hydroxy-methyl-benzoic acid or 4-($\beta$-hydroxyethoxy)-benzoic acid can be condensed with itself to produce a polymer having a melting point slightly above 200° C. Here again, however, the field is very restricted and closely analogous compounds such as 4-($\beta$-hydroxyethyl)-benzoic acid when condensed with itself produces a polymer having a melting point below 200° C. The same applies to 4-($\beta$-hydroxyethoxy)-phenyl-acetic acid.

I have now found that the introduction of one methyl group in the 3-position of 4-($\beta$-hydroxyethoxy)-benzoic acid considerably increases the melting point of the polymer produced from the hydroxy-carboxylic acid. Thus whereas poly-4-($\beta$-hydroxyethoxy)-benzoic acid melts at 200–210° C. the polymer from 4-($\beta$-hydroxyethoxy)-3-methyl-benzoic acid melts at 290–295° C. This intermediate 4 - ($\beta$ - hydroxyethoxy) - 3 - methyl-benzoic acid and its esters, for example its methyl, ethyl and phenol esters and its formyl and acetyl esters, as well as its polymers and co-polymers, are new compounds and form part of the present invention.

The melting point of 290–295° C. is rather high for some purposes, particularly for ease of melt spinning, and accordingly it is within the invention to form a mixture of the polymer with another polymer, particularly another polyester, or to form a co-polymer of 4-($\beta$-hydroxyethoxy)-3-methyl-benzoic acid with other polyester-forming reagents. Such other polyester-forming reagents may be of the simple aliphatic type, such as hydroxy-polymethylene carboxylic acids or polymethylene dicarboxylic acids with polymethylene glycols, but are preferably of the aromatic type capable, when condensed alone, of yielding homopolyesters of high melting point of the order of 200° or more, as set out above, for instance terephthalic acid with ethylene glycol, 4.4'-dicarboxy-diphenyl with ethylene glycol or the unsubstituted 4-($\beta$-hydroxyethoxy)-benzoic acid. Such mixtures or co-polymers may be produced in any convenient way. For example the already formed polymer from 4-($\beta$-hydroxyethoxy)-3-methyl-benzoic acid may be mixed with an already formed polymer, for example from terephthalic acid and ethylene glycol or from 4-($\beta$-hydroxyethoxy)-benzoic acid, and the two polymers quickly melted together to form a mixture, or alternatively the melting may be continued until a substantially homogeneous co-polymer is obtained, or the monomeric compounds may be mixed together initially and the whole condensed to form the co-polymer.

Preferably the amount of such admixed reagents is such that the melting point of the co-polymer is not less than 230° C. and most advantageously is in the range of 240–270° C.

The new monomer 4-($\beta$-hydroxyethoxy)-3-methyl-benzoic acid may be produced by reaction of ethylene chlorhydrin upon 4-hydroxy-3-methyl-benzoic acid while the esters may be produced by esterification of the free acid, for example with methyl or ethyl alcohol, or by acidylation, e. g. with formic acid, acetic anhydride or acetyl chloride or other acid anhydride or halide, of the free alcoholic groups. The invention also includes the mixed esters in which both the alcohol group and the carboxylic group are esterified, as for example in methyl-4-($\beta$-formyloxyethoxy)-3-methyl-benzoate. Such mixed esters may likewise be used for the production of the polymers.

The polyester-forming reaction may be carried out by the standard methods, for example carboxy and hydroxy groups may be present in the reaction mixture in the free state, in which case an esterification catalyst is preferably present, for example para-toluene sulphonic acid, phosphoric acid, sulphamic acid and the like, or alternatively the carboxy and hydroxy groups may be present in the form of ester-forming derivatives.

For example, and this is the preferable form, the carboxy group may be present as an ester of a volatile monohydroxy compound, for example methyl alcohol, ethyl alcohol, phenol and the like. In such a process of ester-interchange it is again preferable to have a catalyst present, for example magnesium, sodium or sodium and magnesium or lithium. Again the hydroxy groups may be present in the form of simple esters of acids which are readily volatile under the polyesterification conditions. Thus the hydroxy groups may be present in the form of formates or acetates.

Where in a reaction between a dicarboxylic acid and a glycol the glycol is volatile under the reaction conditions, it is preferably used in a large excess and the excess allowed to evaporate. Generally the esterification is carried out at relatively high temperatures in the melt or in solution in an inert solvent. Temperatures of the order of 200–250° may be used, especially in the early stages, and in the later stages still higher temperatures, for example 250–300° C. In these later stages it is desirable to carry out the reaction under low pressure, for example a pressure of the order of 2 mms. of mercury or less, in order to remove the volatile by-product, which may be a volatile mono-hydroxy compound such as methanol, ethanol or phenol, or a volatile glycol such as ethylene glycol. The esterification is preferably continued until a product having fibre-forming properties is produced. For this purpose the reagents, if substantially non-volatile under the reaction conditions, should be employed in such proportions that there are substantially equal numbers of hydroxy and carboxy groups or their equivalents in the reaction mixture. Where one of the reagents is volatile and is allowed to evaporate during the reaction, that reagent should be employed in excess.

The following examples illustrate the production of the intermediate and of the polymers according to the invention, all parts being by weight. The reaction temperatures in the various polymerisations are oil bath temperatures.

EXAMPLE 1

*Production of 4-(β-hydroxyethoxy)-3 - methyl-4-benzoic acid*

14.4 parts of 4-hydroxy-3-methyl-benzoic acid were dissolved in a solution of 7.6 parts of caustic soda in 100 parts of water. The solution was heated to about 60° C. and 7.64 parts of ethylene chlorhydrin added gradually with shaking. The solution was refluxed for ½ hour and then acidified with concentrated hydrochloric acid. This precipitated a product having a melting point of about 148–158° C. This crude product was recrystallised from ethyl acetate to give a product, 4 - (β-hydroxyethoxy)-3-methyl - benzoic acid, having a melting point of 188–192° C.

EXAMPLE 2

*Preparation of the ethyl ester*

12.3 parts of 4-(β-hydroxyethoxy)-3-methylbenzoic acid were refluxed for 7 hours with 178 parts of dry ethanol and 11 parts by weight of concentrated sulphuric acid. The mixture was then cooled, neutralised with sodium bicarbonate and filtered. White plates separated from the filtrate on cooling and were found to be mostly unchanged acid. The ester was obtained by removing most of the ethanol from the filtrate by evaporation on the water bath and pouring the residue into water. The product at this stage had a melting point of 57–59° C. It was recrystallised from a mixture of petrol ether and benzene and washed with dilute caustic soda. The product then had a melting point of 59–60° C. and was white.

EXAMPLE 3

*Production of the homo-polymer*

2 parts of ethyl-4-(β-hydroxyethoxy)-3-methyl-benzoate with a small quantity of magnesium ribbon and sodium methylate (obtained by dissolving 0.25 part of sodium in 80 parts of methanol) were heated under a reflux condenser with a stream of nitrogen passing through the apparatus. The reflux condenser was cooled with cold water. After a few minutes heating at 180° C. the condenser water was run out so as to constitute an air condenser. The oil bath temperature was maintained at 180° C. for a further hour, the condenser was then removed and nitrogen bubbled through the melt. The temperature was gradually raised so as to maintain the polymer in the molten state. The final polymer had a melting point of 290–292° C.

EXAMPLE 4

*Production of the co-polymer*

1.5 parts of the polymer obtained according to Example 3 and 0.4 part of polymer obtained from dimethyl terephthalate and ethylene glycol were powdered together and dried by heating in a stream of nitrogen for ½ hour at 140° C. The mixture was then melted by heating at 345° C. for about 10 minutes, when the temperature of the bath was lowered to 310–320° C. The temperature was maintained at this value for 3½ hours. The product at the end of this stage had a melting point of 250–255° C. and gave fibres having some cold-drawing properties. Heating was continued for a further hour at 310° C. under an abbsolute pressure of 2 mms. of mercury. The appearance and melting point of the product remained the same. At the end of this further period of heating, fibres drawn from the product had about 100% cold draw.

EXAMPLE 5

*Co-polymer with terephthalate and glycol*

2 parts of ethyl - 4 - (β-hydroxyethoxy)-3-methylbenzoate, prepared according to Example 2, 0.45 part of dimethyl terephthalate, 0.23 part of ethylene glycol and a small quantity of magnesium ribbon and sodium methylate dissolved in methanol were refluxed together for about 1 hour at 120° C. using a water-cooled condenser. The condenser was then converted to an air condenser and the temperature gradually raised to 180° C. After 45 minutes the condenser was removed and heating continued at 180° C. for 30 minutes and then at 260° C. for 45 minutes, by which time the melt was quite viscous. The temperature of 260° C. was maintained for a further hour, followed by 4 hours at 280° C. The product then had a melting point of 240–245° C. and gave short fibres. It was further heated for 5 hours at 280° C. under an absolute pressure of 1 mm. of mercury. The melting point remained unaltered but the product gave fibres having cold-drawing properties.

EXAMPLE 6

*Co-polymer with hydroxyethoxy-benzoic acid*

2 parts of ethyl - 4 - (β - hydroxyethoxy)-3- methylbenzoate prepared as in Example 2 and 1 part of methyl-4-(β-hydroxyethoxy)-benzoate with a small quantity of magnesium ribbon and sodium methylate in methanol were heated slowly without a condenser so that the methanol gradually distilled off. After 2 hours the temperature had reached 255° C. and the reaction then became more vigorous. After a further 20 minutes the melt was quite viscous and could be solidified on cooling to a crystalline solid. The temperature was gradually raised to 300° C. as the melting point increased, and after 4 hours the pressure was reduced to an absolute pressure of 1 mm. of mercury. These conditions were maintained for a further hour. The product was then a hard crystalline mass having a melting point of 260–265° C. From the melt it gave fibres having cold-drawing properties.

Having described my invention, what I desire to secure by Letters Patent is:

1. 4-(β-hydroxyethoxy)-3-methyl-benzoic acid.
2. An ester of 4-(β-hydroxyethoxy)-3-methyl-benzoic acid with a compound containing an OH group.
3. An ester of 4-(β-hydroxyethoxy)-3-methyl-benzoic acid with a compound containing a single OH group volatile at 300° C.
4. A substance selected from the group consisting of the methyl, ethyl, formyl and acetyl esters of 4-(β-hydroxyethoxy)-3-methyl-benzoic acid.
5. Poly-4-(β-hydroxyethoxy)-3-methyl-benzoic acid.
6. A polymer whose structural units consist predominantly of

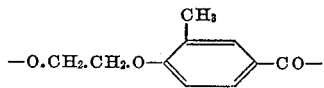

7. A polyester of 4-(β-hydroxyethoxy)-3-methyl-benzoic acid.
8. A polyester of a major proportion of 4-(β-hydroxyethoxy)-3-methyl-benzoic acid and a minor proportion of another hydroxy carboxylic acid.
9. A polyester of a glycol, a dicarboxylic acid and a major proportion of 4-(β-hydroxyethoxy)-3-methyl-benzoic acid.
10. A polyester of 4-(β-hydroxyethoxy)-3-methyl-benzoic acid and another aromatic hydroxy carboxylic acid, said polyester having a melting point of at least 230° C.
11. A polyester as set forth in claim 10 in which said other hydroxyacid is 4-(β-hydroxyethoxy)-benzoic acid, said polyester having a melting point of 240 to 270° C.
12. A polyester of 4-(β-hydroxy-ethoxy)-3-methyl-benzoic acid and a glycol and an aromatic dicarboxylic acid, said polyester having a melting point of at least 230° C.
13. A polyester as set forth in claim 12 in which said glycol is a polymethylene glycol and said aromatic dicarboxylic acid is terephthalic acid.
14. A polyester as set forth in claim 13 in which said glycol is ethylene glycol, said polyester having a melting point of 240 to 270° C.
15. Process for the production of polymers which comprises heating a polyester-forming composition comprising predominantly a substance selected from the group consisting of 4(-β-hydroxyethoxy) - 3 - methyl - benzoic acid and esters thereof with monohydroxy compounds volatile at 300° C. to produce a polyester.

References Cited in the file of this patent

UNITED STATES PATENTS

| Number | Name | Date |
|---|---|---|
| 2,471,023 | Cook et al. | May 24, 1949 |

OTHER REFERENCES

Schmidt-Marliess, Principles of High-polymer Theory and Practice, page 44, published by McGraw-Hill, N. Y. (1948).